(12) United States Patent
Nelson et al.

(10) Patent No.: US 9,092,313 B2
(45) Date of Patent: Jul. 28, 2015

(54) SYSTEM AND METHOD FOR THREE INPUT VOTING

(71) Applicant: Honeywell International Inc., Morristown, MN (US)

(72) Inventors: Donald John Nelson, Phoenix, AZ (US); Stephen Forrest Rogoff, Glendale, AZ (US); LeRoy Ernest Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 302 days.

(21) Appl. No.: 13/749,894

(22) Filed: Jan. 25, 2013

(65) Prior Publication Data

US 2014/0215278 A1   Jul. 31, 2014

(51) Int. Cl.
| | |
|---|---|
| G06F 11/00 | (2006.01) |
| G06F 11/14 | (2006.01) |
| G06F 11/18 | (2006.01) |

(52) U.S. Cl.
CPC .......... *G06F 11/004* (2013.01); *G06F 11/1482* (2013.01); *G06F 11/188* (2013.01)

(58) Field of Classification Search
USPC .............................. 365/35; 714/797, 819, 820
See application file for complete search history.

(56) References Cited

U.S. PATENT DOCUMENTS

| | | | |
|---|---|---|---|
| 3,305,735 A | 2/1967 | Moreines | |
| 3,412,261 A | 11/1968 | Hickin et al. | |
| 3,420,993 A | 1/1969 | Chamberlain et al. | |
| 3,492,588 A | 1/1970 | Woodward, Jr | |
| 3,530,381 A * | 9/1970 | Klein et al. | .................. 324/71.1 |
| 3,610,950 A | 10/1971 | Keller et al. | |
| 3,631,352 A | 12/1971 | Kelley et al. | |
| 3,708,735 A | 1/1973 | Barltrop | |
| 3,725,818 A | 4/1973 | Nurmohamed et al. | |
| 3,805,235 A | 4/1974 | Foster et al. | |
| 4,105,900 A | 8/1978 | Martin et al. | |
| 4,264,955 A | 4/1981 | Goodwin | |
| 4,276,648 A | 6/1981 | Tomlinson | |
| 4,327,437 A | 4/1982 | Gelderloos | |
| 4,375,683 A | 3/1983 | Wensley | |

(Continued)

OTHER PUBLICATIONS

Williams, T.J., Schaffer, E.J. Rohr, A. Redundant and Voting Systems, Instrument Engineers Handbook: Process Measurement and Analysis vol. I, 2003, CRC Press, Fourth Edition, pp. 126-135.*

(Continued)

*Primary Examiner* — Gabriel Chu
*Assistant Examiner* — Paul Contino
(74) *Attorney, Agent, or Firm* — Fogg & Powers LLC (57) ABSTRACT

An embodiment described herein includes a method for input channel voting. The method includes steps for sorting the three input values by magnitude into a high input value, a middle input value, and a low input value. The three input values are then tested. The testing includes subtracting the middle input value form the high input value to calculate a first difference, and comparing an absolute value of the first difference to a failure threshold. A first intermediate value is determined based on the comparison of the first difference to the failure threshold. The testing also includes subtracting the middle input value from the low input value to calculate a second difference, and comparing the second difference to the failure threshold. A second intermediate value is determined based on this comparison. The first intermediate value and second intermediate value are averaged to produce an output based on the three input values.

20 Claims, 8 Drawing Sheets

(56) References Cited

U.S. PATENT DOCUMENTS

| | | |
|---|---|---|
| 4,472,806 A | 9/1984 | Blair |
| 4,517,639 A | 5/1985 | Ferrell et al. |
| 4,583,010 A | 4/1986 | Brentnall |
| 4,593,249 A | 6/1986 | Arita et al. |
| 4,707,621 A | 11/1987 | Arita et al. |
| 4,771,427 A | 9/1988 | Tulpule et al. |
| 4,926,364 A * | 5/1990 | Brotherton .................... 702/179 |
| 4,972,415 A | 11/1990 | Walter et al. |
| 5,202,679 A | 4/1993 | Tulpule et al. |
| 5,274,554 A | 12/1993 | Takats et al. |
| 5,297,052 A | 3/1994 | McIntyre et al. |
| 5,406,247 A | 4/1995 | Nagaraj |
| 5,414,718 A | 5/1995 | Bascans et al. |
| 5,515,282 A | 5/1996 | Jackson |
| 5,710,776 A | 1/1998 | Tomlinson et al. |
| 5,802,077 A | 9/1998 | Yeh |
| 7,289,889 B2 * | 10/2007 | Naik et al. ........................ 701/1 |
| 7,421,320 B2 * | 9/2008 | Yeh .................................. 701/3 |
| 7,579,879 B2 | 8/2009 | Erstand et al. |
| 7,698,668 B2 * | 4/2010 | Balasubramanian et al.  716/106 |
| 2010/0106448 A1 | 4/2010 | Satterfield et al. |
| 2012/0053761 A1 | 3/2012 | Dayre et al. |
| 2013/0148397 A1 * | 6/2013 | Schroeder et al. ............ 363/132 |

OTHER PUBLICATIONS

Dierkes, Michael, Formal Analysis of a Triplex Sensor Voter in an Industrial Context, 2011, Springer-Verlag, pp. 102-116.*

Krstic, M.D., Stojcev, M.K., Djordjevic, G.Lj., Andrejic, I.D., A Mid-Value Select Voter, Faculty of Electronic Engineering, University of Nis, 2004.*

European Patent Office, "Office Action from EP Application No. 14150688.1 mailed Apr. 28, 2014", "from Foreign Counterpart of U.S. Appl. No. 13/749,894", Apr. 28, 2014, pp. 1-4, Published in: EP.

Euorpean Patent Office, "Communication under Rule 71(3) for Appication Serial No. 14150688.1", "from Foreign Counterpart U.S. Appl. No. 13/749,894", Dec. 3, 2014, pp. 1-32, Published in: EP.

* cited by examiner

SYSTEM AND METHOD FOR THREE INPUT VOTING

BACKGROUND

High integrity sensing systems must provide "trusted" data, with an extremely low probability of the data being erroneous and/or misleading. To ensure that inaccurate data is properly identified and that only tested and verified data is presented to the data user as "trusted" data, multiple independent data measurements are made. The measurements are compared to each other by data comparison and voting routines. A minimum of three independent data sources are often used since comparing two sources can expose a problem, but it is often not possible to determine which one is correct. For most systems, three independent sources is sufficient to both detect and isolate any single offender, so that normal operation can continue as long as the exposure time for a second failure is less than 1/(failure rate).

Two approaches are commonly used. The first approach is middle or median value selection. Median value selection, in its simplest implementation, selects the middle value of the three values, and uses it as the selected output. If the input data is noisy, the output can step between the various input channels because the output will always be the middle value for each set of the three readings. This results in a smooth output as long as the offset difference between the various input channels is small, and the amplitude of any noise on the individual channels is small and cyclic. However, this can result in step changes (toggling) of the output if there is significant offset between the 3 input channels and cyclic noise is present.

Toggling can be overcome in more complex implementations by generating error signals for each input based on the difference from the last valid middle value. These error signals are then used to correct the following input signals to force convergence of the 3 channels around the middle value. The correction signals are also magnitude checked to detect excessive input errors, and they are limited to and accumulated for the signal convergence routine. In a stable environment, all input channels will eventually converge to the value of the middle input, independent of any influence of the other two channels.

This median value selection technique requires complex data processing and, in a stable environment, results in the same output as the simple implementation. However, in a less stable environment, and/or in the presence of an input channel failure, this technique results in an output value that transitions smoothly when the middle value changes to a new value from the same input channel, or a different input channel with a different value.

The second approach is a limit test and average approach. The limit test and average approach performs a comparison of the three inputs A, B, and C. It compares the difference between A and B; A and C; and B and C to a specified limit. If the difference between the inputs is less than the specified limit, then the limit test is in a condition to pass. If all three limit tests pass, the three inputs are averaged together to provide an output value. If two of the three limit tests fail, the failures can be isolated to the channel common to the two limit tests. But, if only one limit test fails, additional comparison testing is required to determine the failed channel. This is because the normal difference between the high and low channels is always greater than the difference between the high and middle channels, and low and middle channels. This normal difference is not accommodated by this simple three way comparison technique. To address this issue, a higher failure threshold could be used for any single comparison test failure for the single failure case. However, this requires additional test logic and added complexity. All input data that passes the threshold test are used to produce an average output.

SUMMARY

An embodiment described herein includes a method for input channel voting. The method includes steps for sorting the three input values by magnitude into a high input value, a middle input value, and a low input value. The three input values are then tested. The testing includes subtracting the middle input value form the high input value to calculate a first difference, and comparing an absolute value of the first difference to a failure threshold. A first intermediate value is determined based on the comparison of the first difference to the failure threshold. The testing also includes subtracting the middle input value from the low input value to calculate a second difference, and comparing the second difference to the failure threshold. A second intermediate value is determined based on this comparison. The first intermediate value and second intermediate value are averaged to produce an output based on the three input values.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Some embodiments described herein relate to systems and methodology for simplified fault tolerant three input channel voting. Simplified, in this context, refers to the fact that, for a three channel system, only two comparison tests and only one failure threshold are used. Additionally, the output is smoothed by mid-value biasing.

Figure 1:
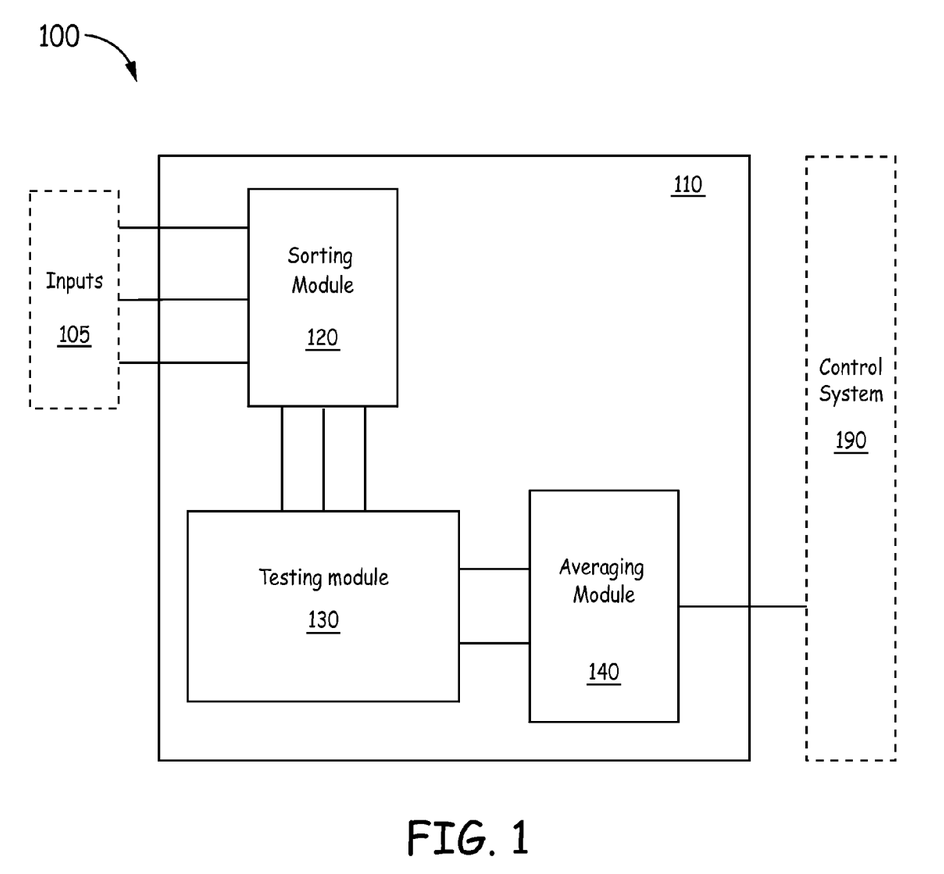
FIG. 1 illustrates high-level functional blocks according to one embodiment of a system including a three input voting apparatus.

FIG. 1 illustrates high-level functional blocks of one embodiment of a system 100 including a three input channel voting apparatus 110. The system 100 includes three inputs 105 that feed into a three input channel voting apparatus 110. The three inputs 105 can be received from a set of (three) sensors that are configured to provide redundant data measurements on the three inputs. Any type of sensor can be used for the sensors, including but not limited to as pressure sensors, accelerometers, or gyroscopes. The inputs 105 feed into sorting module 120 of the three input channel voting apparatus 110. The sorting module 120 sorts the three inputs 105 by magnitude into a low signal, middle signal, and high signal. At this stage, the system tracks the input source for each output signal. In one embodiment, the tracking can be accomplished by software. The low, middle, and high signals are then sent to testing module 130. The testing module 130 compares the differences between the high and middle signals, and the low and middle signals to a failure threshold. In one embodiment, this can be accomplished by taking the absolute value of the difference high minus middle and comparing it to a failure threshold, and also taking the absolute value of the difference middle minus low and comparing it to the failure threshold.

If the difference is greater than the failure threshold, the non-middle signal fails the test, and a fail bit is set. If the high and low signals do not pass the threshold comparison test, a signal indicative of this result is sent out as a first intermediate value corresponding to the high signal, and a second intermediate value corresponding to the low signal. In one embodiment, if the non-middle signal fails, the middle signal can be used as the intermediate value. In another embodiment, a last valid output can be used as the first or second intermediate value. A last valid output, in other words, is the most recently valid intermediate from a previous cycle. For example, if the high signal fails the test, the most recently valid first intermediate value is used. If the low signal fails the test, the most recently valid second intermediate value is used. In yet another embodiment, the last valid output can be the output of the averaging module from a previous cycle of measurements.

If the difference is less than the failure threshold, the signals are considered to have passed. In this scenario, a middle signal biasing of the signal occurs. For example, in one embodiment, if the high signal passes the test, the high signal can be averaged with the middle signal as the first intermediate value. If the low signal passes the test, the low signal can be averaged with the middle signal as the second intermediate value.

The first and second intermediate values are then sent to averaging module 140. The averaging module averages together the first intermediate value and second intermediate value. The resulting signal is then sent to control system. In one embodiment, the control system can be a flight control system. A person having ordinary skill in the art will appreciate that the control system can be any high integrity sensing systems that rely on "trusted" data that use multiple inputs or measurements.

Figure 2A:
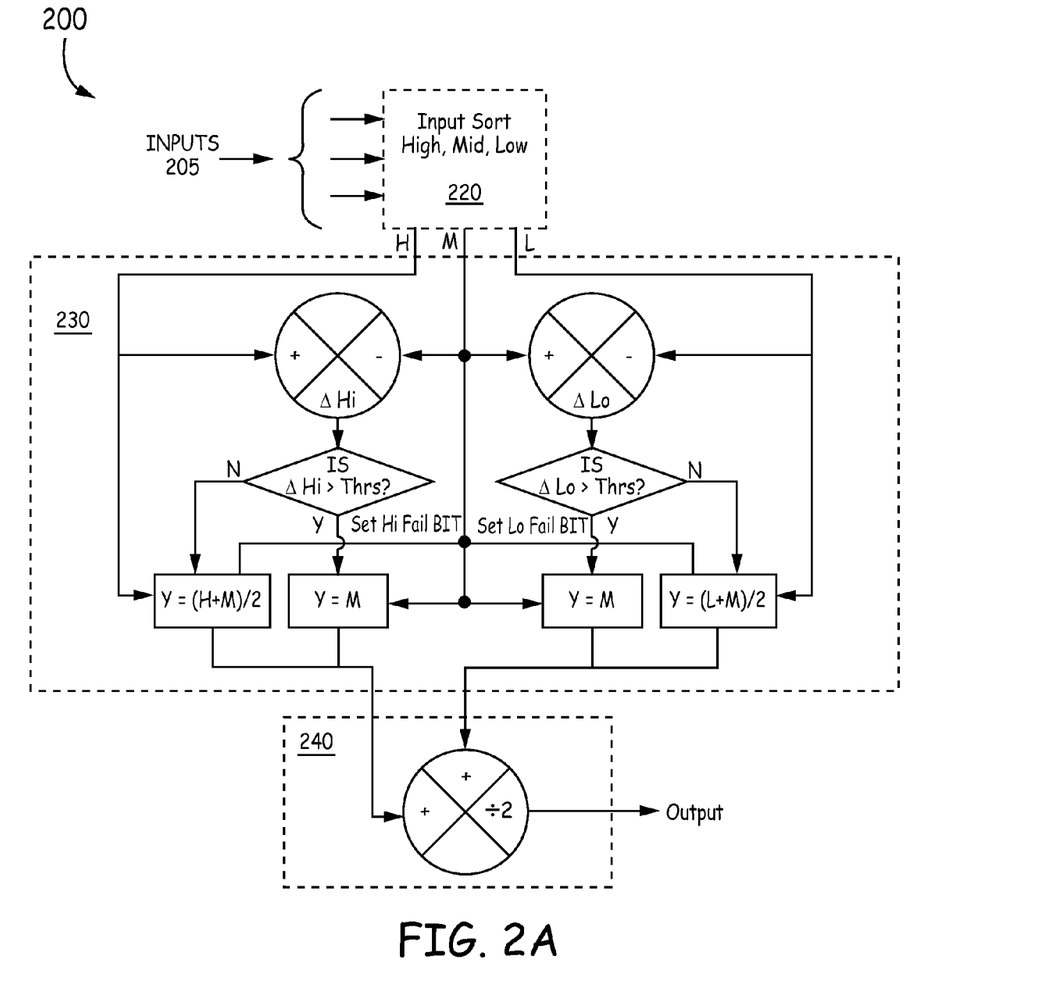
FIG. 2A illustrates a functional block diagram according to one embodiment of the three input voting apparatus of FIG. 1.

FIG. 2A is an exemplary functional block diagram according to one embodiment of a fault tolerant three input channel voting apparatus 200. Three inputs 205 are provided to first module 220. The first module 220 sorts the inputs 205 by magnitude into three output signals: a high signal, middle signal, and low signal. The apparatus 200 can track the input source for each output signal. In one embodiment, this is accomplished through software tracking The high signal, middle signal, and low signal are connected to a second module 230. The second module 230 compares the difference between the high signal and middle signal, and low signal and middle signal, to a failure threshold. If the absolute value of the difference between the high signal and middle signal is greater than the failure threshold, a fail bit is set to indicate the high signal failed, and the middle signal is output as a first output to the third module. If the absolute value of the of the difference between the high signal and the middle signal is less than failure threshold, then the high signal is averaged with the middle signal and output as a first output to third module 240.

The same procedure is performed with the low signal. If the absolute value of the difference between the middle signal and low signal is greater than the failure threshold, a fail bit is set to indicate the low signal failed and the middle signal is output as a output to the third module. If the absolute value of the difference between the middle signal and low signal is less than the failure threshold, then the low signal is averaged with the middle signal and output the third module 240. The third module 240 then averages together the first output and second output from the second module 230.

The first, second, and third modules can be implemented in a number of manners, depending on the application. In some embodiments, all or some of the three modules can be implemented in software, or firmware in a FPGA or other system on a chip application. In other embodiments, all or some modules can be implemented as analog circuits.

Figure 2B:
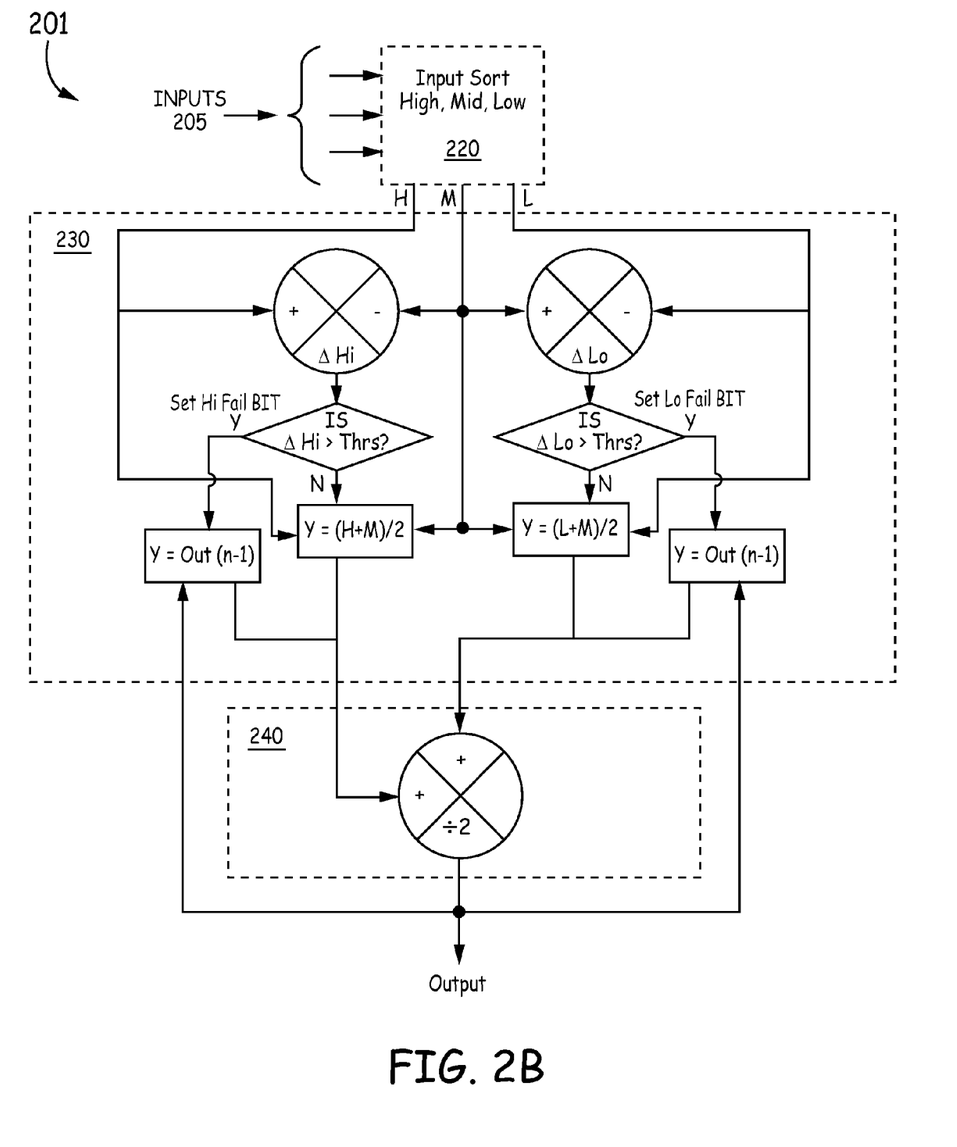
FIG. 2B illustrates a functional block diagram according to an alternative embodiment of the three input voting apparatus of FIG. 1.

FIG. 2B is an exemplary functional block diagram according to another embodiment of a fault tolerant three input channel voting apparatus 201. Three inputs 205 are provided to first module 220. The first module 220 sorts the inputs 205 by magnitude into three output signals: a high signal, middle signal, and low signal. The signals are then fed to second module 230. Like previously, the input source can be tracked for each output. The second module 230 compares the difference between the high signal and middle signal, and low signal and middle signal to a failure threshold.

If the absolute value of the difference between the high signal and middle signal is greater than the failure threshold, a fail bit is set to indicate the high signal failed, and a last valid output is used as the current first output. In FIG. 2B, the last valid output is the most recent previous output from the averaging module. In another embodiment, the last valid output can be the most recent valid first output signal where a valid high signal was averaged with the middle signal.

If the absolute value of the difference between the high signal and middle signal is less than the failure threshold, the high signal is averaged with the middle signal and output as the first output to the third module.

The second module 230 performs the same procedure on the low signal. If the absolute value of the difference between the middle signal and the low signal is greater than the failure threshold, a last valid output is used as the second output. If the absolute value of the difference between the middle signal and low signal is less than the failure threshold, the low signal is averaged with the middle signal and output as the second output to the third module 240. The third module 240 then averages together the first and second outputs from the second module 230.

Figure 2C:
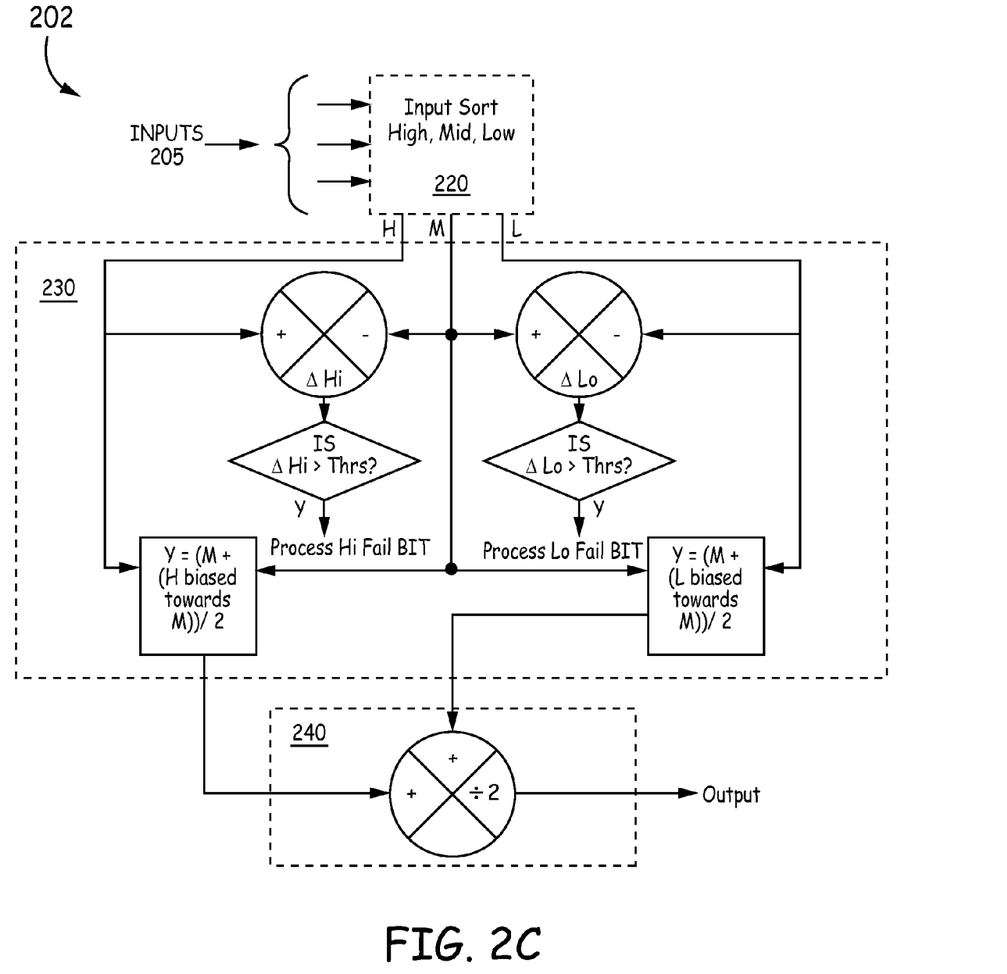
FIG. 2C illustrates a functional block diagram according to another embodiment of the three input voting apparatus of FIG. 1.

FIG. 2C is an exemplary functional block diagram according to an alternative embodiment of a fault tolerant three input channel voting apparatus 202. Three inputs 205 are provided to first module 220. The first module 220 sorts the inputs 205 by magnitude into three output signals: a high signal, middle signal, and low signal. The signals are then output to second module 230. Second module 230 compares the difference between the high signal and middle signal, and low signal and middle signal to a failure threshold. If the absolute value of the difference between the high signal and middle signal is greater than the failure threshold, a fail bit is set to indicate the high signal failed. In both a failure scenario and passing scenario, where the absolute value of the difference between the high value and middle value is less than the failure threshold, the first output will always be an average of the middle value and the high signal biased towards the middle signal. In one embodiment, the high signal is biased towards the middle value based on the percentage of the failure threshold the difference between the high signal and middle signal represent. For example, if the high signal minus the middle signal amounts to half of the failure threshold, then the biased high signal would be: high−(50% of (high-minus middle)). Thus, the greater the difference between the high and mid, the less of the high input is used in the first output. If the failure threshold is exceeded, the first output will be the middle signal. A person having ordinary skill in the art will recognize that other biasing schemes may be used to fit the needs of different applications. The same process is repeated for the low signal comparison test, where, the second output is the middle signal averaged with the low signal biased towards the middle signal. In one embodiment, the low signal can be biased based on the percentage of the failure threshold the difference between the middle signal and low signal represent. In the case that the difference is half of the failure threshold, the biased low signal would be: (low +(50% of (middle-low)). The first output and second output are then coupled to the third module 240. The third module 240 averages the first and second outputs of second module 230.

Figure 3A:
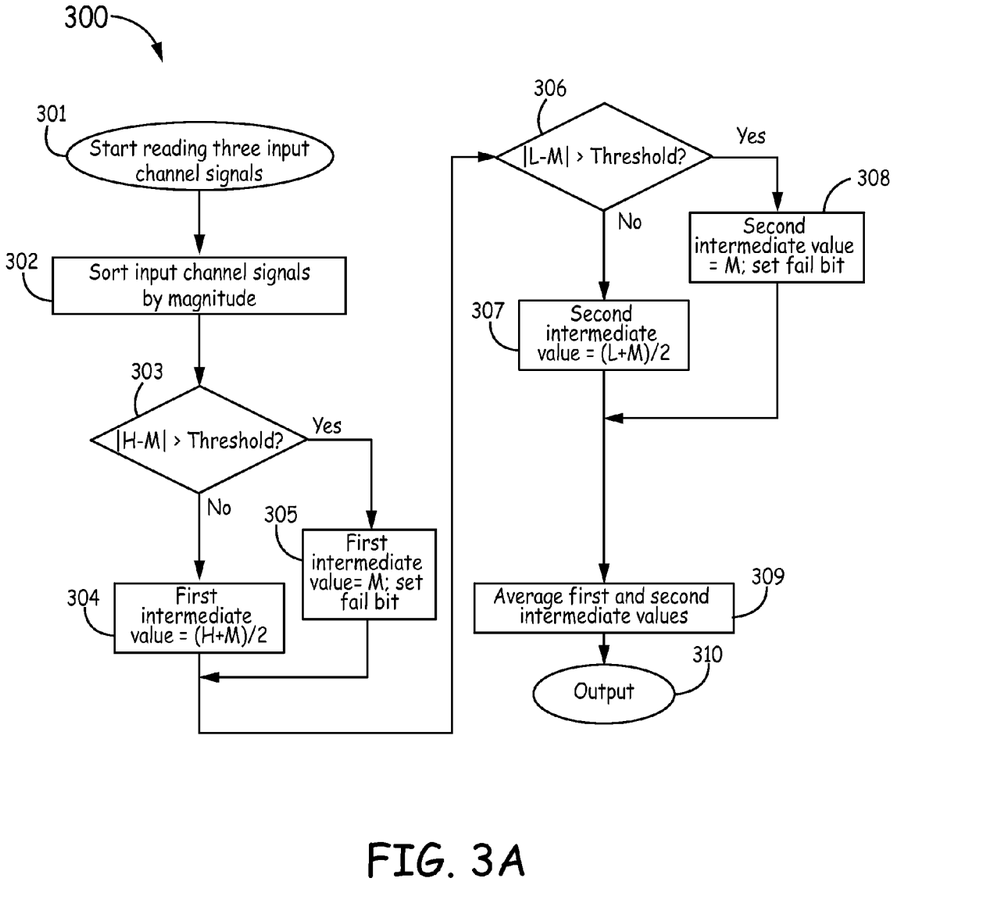
FIG. 3A illustrates methodology of exemplary operation of the three input voting apparatus of FIG. 2A.

FIG. 3A illustrates exemplary methodology according to one embodiment of a fault tolerant three input channel voting apparatus 300. At block 301, the routine begins by reading three input channel values. At block 302, the three input channels are sorted by magnitude into a low signal, middle signal, and high signal. At decision block 303, the absolute value of the difference between the high signal and middle signal are compared to a failure threshold. If the absolute value of the difference between the high signal and middle signal is less than the failure threshold, an average of the middle signal and high signal is used as a first intermediate value at block 304. If the absolute value of the difference between the high signal and middle signal is greater than the failure threshold, the first intermediate value is M, and a fail bit is set for the high signal as indicated at block 305. At conditional block 306, the absolute value of the difference between the low signal and middle signal is compared to the failure threshold. If the absolute value of the difference between the low signal and middle signal is less than the failure threshold, at block 307, a second intermediate value is determined as an average of the low signal and middle signal. If the absolute value of the difference between the low signal and middle signal is greater than the failure threshold, at block 308, the second intermediate value is the middle signal, and a fail bit is set for the low signal. At block 309, the first and second outputs are averaged together to provide an output at block 310.

In some alternative embodiments, steps at blocks 303-305, and blocks 306-308 may be performed with blocks 303-305 first, followed by blocks 306-308, or with blocks 306-308 first, followed by blocks 303-305, or alternatively, the two sets of steps 303-305 and 306-308 may be executed simultaneously.

Figure 3B:
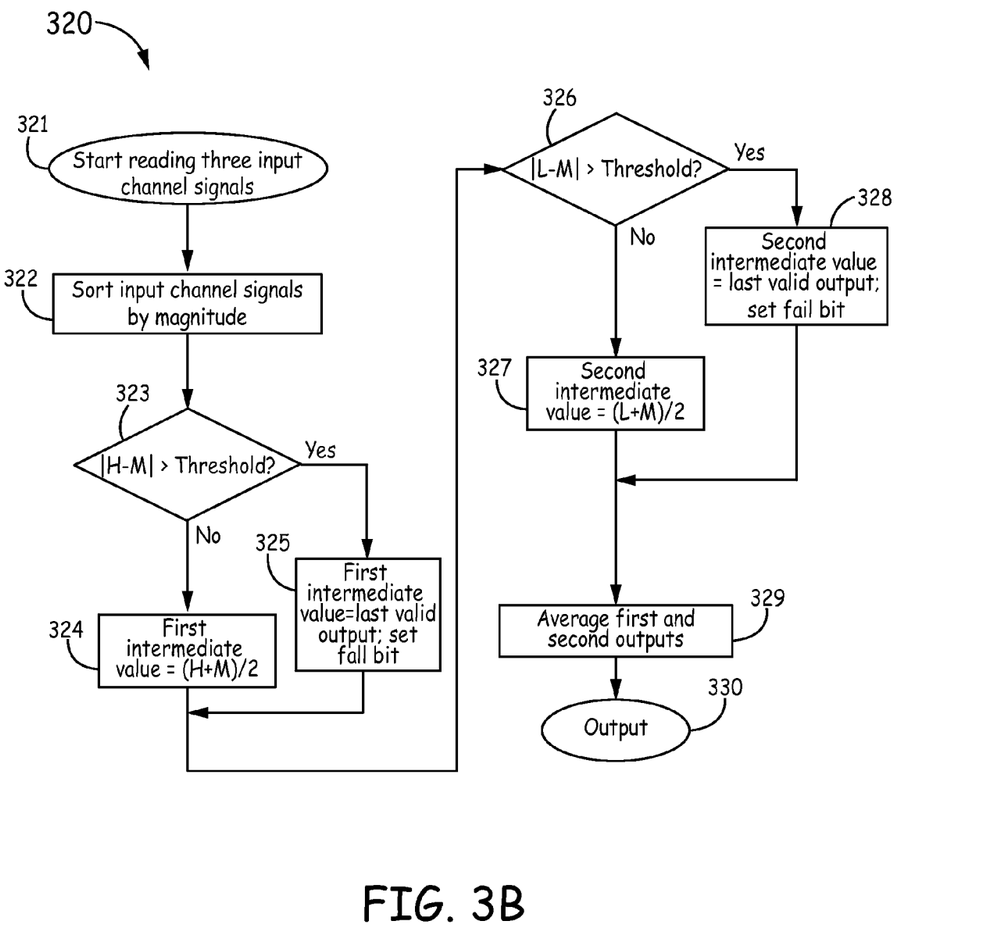
FIG. 3B illustrates methodology of exemplary operation of the three input voting apparatus of FIG. 2B.

FIG. 3B illustrates exemplary methodology according an alternate embodiment of the invention. At block 321, the routine begins by reading three input channel values. At block 322, the three input channels are sorted by magnitude into a low signal, middle signal, and high signal. At decision block 323, the absolute value of the difference between the high signal and middle signal are compared to a failure threshold. If the absolute value of the difference between the high signal and middle signal is less than the failure threshold, the first intermediate value is an average of the middle signal and high signal at block 324. If the absolute value of the difference between the high signal and middle signal is greater than the failure threshold, the first intermediate value is the last valid output, and a fail bit is set for the high signal as indicated at block 325. At conditional block 326, the absolute value of the difference between the low signal and middle signal is compared to the failure threshold. If the absolute value of the difference between the low signal and middle signal is less than the failure threshold, at block 327, the second intermediate value is an average of the low signal and middle signal. If the absolute value of the difference between the low signal and middle signal is greater than the failure threshold, at block 328, the second intermediate value is a last valid output, and a fail bit is set for the low signal. At block 329, the first and second intermediate values are averaged together to provide an output at block 330.

In other embodiments, the steps at blocks 323-325, and blocks 326-328 may be performed with blocks 323-325 first, followed by blocks 326-328, or with blocks 326-328 first followed by blocks 323-325, or alternatively, the two sets of steps 323-325 and 326-328 can be executed simultaneously.

Figure 3C:
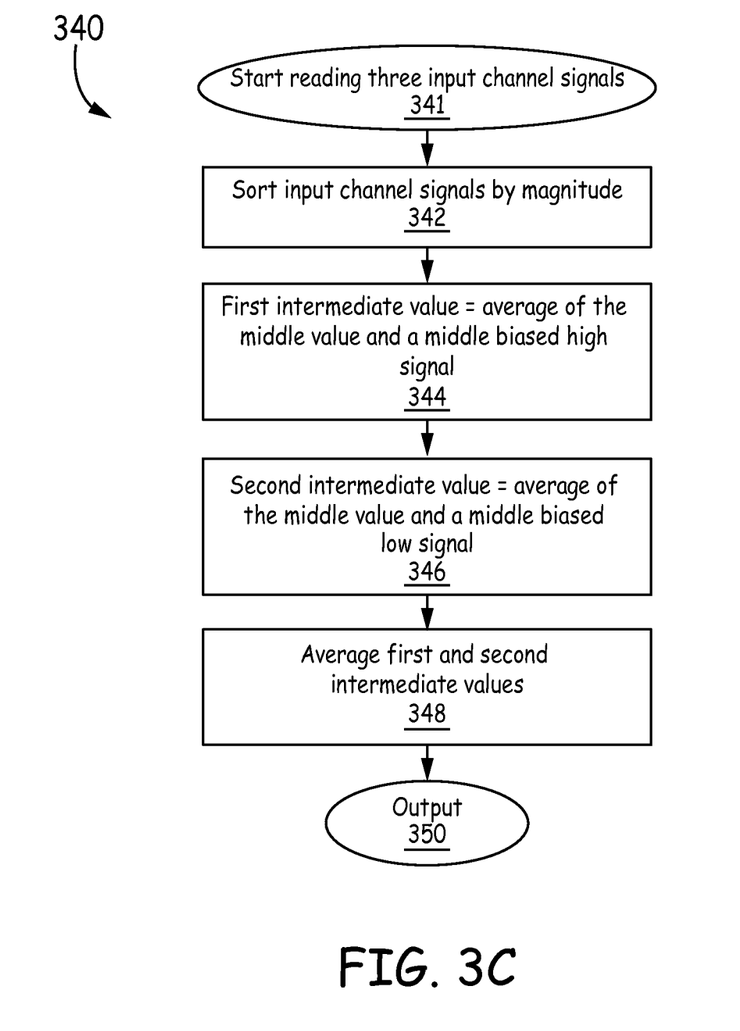
FIG. 3C illustrates methodology of exemplary operation of the three input voting apparatus of FIG. 2C.

FIG. 3C illustrates exemplary methodology according to another embodiment of the invention. At block 341, the routine begins by reading three input channel values. At block 342, the three input channels are sorted by magnitude into a low signal, middle signal, and high signal. At block 344, the first intermediate value is calculated to be the average of the middle signal and a middle biased high signal. At block 346, the second output is calculated to be the average of the middle signal and a middle biased low signal. At block 348, the first and second intermediate values are averaged together to provide an output at block 350.

Figure 4:
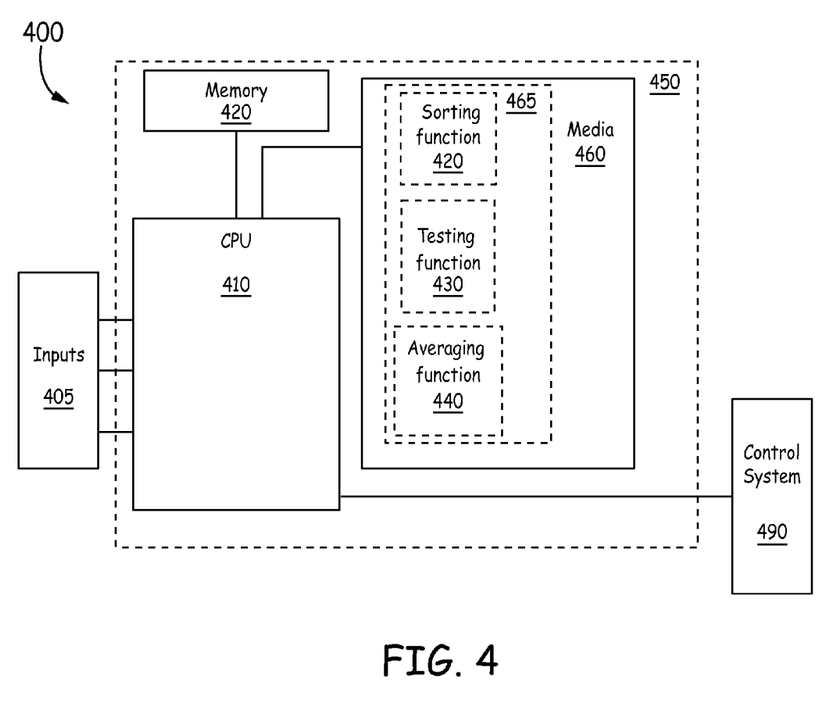
FIG. 4 illustrates a hardware block diagram according to one embodiment of the three input voting apparatus of FIG. 1.

FIG. 4 illustrates a hardware block diagram according to one embodiment of a system for fault tolerant three input channel voting 400. Inputs 405 are coupled to a computer system 450 which minimally contains a central processing unit (CPU) 410 and computer memory 420. Instructions are stored in memory 420, which contain the algorithms and processes for three input channel voting. Memory 420 is coupled to CPU 410. In some embodiments, memory provides the CPU 410 with instructions for a three input channel voting algorithm. In some embodiments, memory can be in the form of random access memory (RAM), read only memory (ROM), flash memory, or other forms of memory known to those skilled in the art. In other embodiments, the CPU 410, or both CPU 410 and memory 420, can be replaced by different kinds of microprocessors, such as an application specific integrated circuit, or a system on a chip. Computer readable media 460 is connected to CPU 410. Computer readable media 460 contains software instructions 465. Software instructions 465 include a sorting function 420, testing function 430, and averaging function 440. The computer readable media 460 is configured so that CPU 410 retrieves software instructions from computer readable media 460. In some embodiments, the computer readable media may be implemented into system memory, where the system memory is non-volatile ROM, flash memory. CPU 410 receives inputs 405, and runs them through instructions found in sorting function 420, testing function 430, and averaging function 440. The testing function 430 executed by the CPU is one of the testing and comparison routines discussed above in relation to FIGS. 3A, 3B, or 3C. The output of the averaging function 440 as executed by the CPU 410 is then coupled to control system 490.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a method for three input channel voting comprising the steps of: sorting three input values by magnitude into a high input value, a middle input value, and a low input value; testing the three input values, wherein the testing further comprises the steps of: subtracting the middle input value from the high input value to calculate a first difference; comparing an absolute value of the first difference to a failure threshold, wherein a first intermediate value is determined based on the comparing an absolute value of the first difference to the failure threshold; subtracting the middle input value from the low input value to calculate a second difference; and comparing an absolute value of the second difference to the failure threshold, wherein a second intermediate value is determined based on the comparing an absolute value of the second difference to the failure threshold; and averaging the first intermediate value and the second intermediate value to produce an output indicative of the three input values.

Example 2 includes the method of example 1, wherein: if the absolute value of the difference between the middle input value and high input value is less than the failure threshold, the middle input value and high input value are averaged to calculate the first intermediate value; and if the absolute value of the difference between the middle input and high input is greater than the failure threshold, the middle input value is used as the first intermediate value, and a fail bit is set for an input channel corresponding to the high input value.

Example 3 includes the method of example 1, wherein: if the absolute value of the difference between the middle input value and high input value is less than the failure threshold, the middle input value and high input value are averaged to calculate the first intermediate value; and if the absolute value of the difference between the middle input value and the high input value is greater than the failure threshold, a last valid output is used as the first intermediate value.

Example 4 includes the method of examples 1-3, wherein: if the absolute value of the second difference between the middle input value and a low input value is less than the failure threshold, the middle input value and low input value are averaged to calculate as the second intermediate value; and if the absolute value of the difference between the middle input value and low input value is greater than the failure threshold, then the middle input value is used as the second intermediate value, and a second fail bit is set for a second input channel corresponding to the low input value.

Example 5 includes the method of any of examples 1-3, wherein: if the absolute value of the second difference between the middle input value and a low input value is less than the failure threshold, the middle input value and low input value are averaged to calculate as the second intermediate value; and if the absolute value of the difference between the middle input value and the low input value is greater than the failure threshold, a last valid output is used as the second intermediate value.

Example 6 includes the method of any of examples example 1-5, wherein if there is no failure condition, the averaging of the first and second intermediate values is a middle input value biased average of the three input channels.

Example 7 includes the method of any of examples 1-5, wherein if there is one failure, the averaging of the first and second intermediate values is a middle input value biased average based on input channels that have not failed the comparison test.

Example 8 includes the method of any of examples 1-5, wherein: the first intermediate value is computed as an average of the middle input value and the high input value biased towards the middle input value; and the second intermediate value is computed as an average of the middle input value and the low input value biased towards the middle input value.

Example 9 includes the method of example 8, wherein the high input value is biased towards the middle input value based on the first difference as a percentage of the failure threshold.

Example 10 includes the method of any of examples 8-9, wherein the low input value is biased towards the middle input value based on the second difference as a percentage of the failure threshold.

Example 11 includes an apparatus for executing simplified fault tolerant three input channel voting comprising: a first module for receiving input signals from three measurement sources; wherein, the first module sorts the input signals into a low signal, middle signal, and high signal; a second module coupled to the first module for testing the input signals; wherein, the second module tests differences between the high and middle signals, and low and middle signals by comparing the differences with a failure threshold; the second module provides a first and a second output indicative of results from said testing; and a third module coupled to the output of the second module for averaging outputs from the second module.

Example 12 includes the apparatus of example 11, wherein the second module tests differences between the input signals to the failure threshold, wherein: if an absolute value of the difference between the middle signal and high signal is less than the failure threshold, the middle signal and high signal are averaged together as the first output to the third module; otherwise if the absolute value of the difference between the middle signal and high signal is greater than the failure threshold, then the middle signal is used as the first output to the third module; and if an absolute value of the difference between the middle signal and low signal is less than the failure threshold, the middle signal and low signal are averaged together as the second output to the third module; otherwise if the absolute value of the difference between the middle signal and low signal is greater than the failure threshold, then the middle signal is used as the second output to the third module.

Example 13 includes the apparatus of example 12, wherein: if the absolute value of the difference between the middle signal and high signal is greater than the failure threshold, a last valid output is used as the first output; and if the absolute value of the difference between the middle signal and low signal is greater than the failure threshold, a last valid output is used as the second output.

Example 14 includes the apparatus of any of example 11, wherein: the first output is computed as an average of the middle signal and the high signal biased towards the middle signal; and the second output is computed as an average of the middle signal and the low signal biased towards the middle signal.

Example 15 includes the apparatus of any of examples 11-14 wherein the first, second, and third module are implemented in a system on a chip application.

Example 16 includes a system for simplified fault tolerant three input channel voting comprising: a plurality of sensors providing three input signals; a voting apparatus coupled to the sensors, further comprising: a microprocessor; and a computer readable medium; wherein, the computer readable medium configured to provide instructions to the microprocessor to execute a sorting function, testing function, and averaging function; wherein, the sorting function sorts the three input signals by magnitude into a high signal, middle signal, and low signal; the testing function compares differences between the high signal and middle signal, and middle signal and low signal to a failure threshold, and provides a first intermediate value and second intermediate value indicative of results of said comparison; the averaging function averages the first intermediate value and second intermediate value from the testing module; and a control system coupled to the voting apparatus.

Example 17 includes the system of example 16, wherein the control system is a flight control system.

Example 18 includes the system of example 16-17, wherein the sensors provide air data measurements.

Example 19 includes the system of example 18, wherein the air data comprises static pressure measurements.

Example 20 includes the system of example 16-19, wherein the sorting module, testing module, and averaging module are implemented in a system on a chip application.

What is claimed is:

1. A method for three input channel voting comprising the steps of:
    sorting three input values by magnitude into a high input value, a middle input value, and a low input value;
    testing the three input values, wherein the testing further comprises the steps of:
        subtracting the middle input value from the high input value to calculate a first difference;
        comparing an absolute value of the first difference to a failure threshold, wherein a first intermediate value is determined based on the comparing an absolute value of the first difference to the failure threshold;
        subtracting the middle input value from the low input value to calculate a second difference; and
        comparing an absolute value of the second difference to the failure threshold, wherein a second intermediate value is determined based on the comparing an absolute value of the second difference to the failure threshold; and
    averaging the first intermediate value and the second intermediate value to produce an output indicative of the three input values.

2. The method of claim 1, wherein:
    if the absolute value of the first difference is less than the failure threshold, the middle input value and high input value are averaged to calculate the first intermediate value; and
    if the absolute value of the first difference is greater than the failure threshold, the middle input value is used as the first intermediate value, and a fail bit is set for an input channel corresponding to the high input value.

3. The method of claim 1, wherein:
    if the absolute value of the first difference is less than the failure threshold, the middle input value and high input value are averaged to calculate the first intermediate value; and
    if the absolute value of the first difference is greater than the failure threshold, a last valid output is used as the first intermediate value.

4. The method of claim 1, wherein:
    if the absolute value of the second difference is less than the failure threshold, the middle input value and low input value are averaged to calculate as the second intermediate value; and
    if the absolute value of the second difference is greater than the failure threshold, then the middle input value is used as the second intermediate value, and a second fail bit is set for a second input channel corresponding to the low input value.

5. The method of claim 1, wherein:
    if the absolute value of the second difference is less than the failure threshold, the middle input value and low input value are averaged to calculate as the second intermediate value; and
    if the absolute value of the second difference is greater than the failure threshold, a last valid output is used as the second intermediate value.

6. The method of claim 1, wherein if there is no failure condition, the averaging of the first and second intermediate values is a middle input value biased average of the three input channels.

7. The method of claim 1, wherein if there is one failure, the averaging of the first and second intermediate values is a middle input value biased average based on input channels that have not failed the comparison test.

8. The method of claim 1, wherein:
    the first intermediate value is computed as an average of the middle input value and the high input value biased towards the middle input value; and
    the second intermediate value is computed as an average of the middle input value and the low input value biased towards the middle input value.

9. The method of claim 8, wherein the high input value is biased towards the middle input value based on the first difference as a percentage of the failure threshold.

10. The method of claim 8, wherein the low input value is biased towards the middle input value based on the second difference as a percentage of the failure threshold.

11. An apparatus for executing simplified fault tolerant three input channel voting comprising:
    a first module for receiving input signals from three measurement sources; wherein,
        the first module sorts the input signals into a low signal, middle signal, and high signal;
    a second module coupled to the first module for testing the input signals; wherein,
        the second module tests a difference between the high signal and middle signal, and a difference between the low signal and middle signal by comparing the differences with a failure threshold;
        the second module provides a first and a second output indicative of results from said testing; and
    a third module coupled to the output of the second module, wherein the third module averages the first and second outputs from the second module to produce a third output indicative of the input signals form three measurement sources.

12. The apparatus of claim 11, wherein:
    if an absolute value of the difference between the middle signal and high signal is less than the failure threshold, the middle signal and high signal are averaged together as the first output to the third module;
    if the absolute value of the difference between the middle signal and high signal is greater than the failure threshold, then the middle signal is used as the first output to the third module;
    if an absolute value of the difference between the middle signal and low signal is less than the failure threshold, the middle signal and low signal are averaged together as the second output to the third module; and if the absolute value of the difference between the middle signal and low signal is greater than the failure threshold, then the middle signal is used as the second output to the third module.

13. The apparatus of claim 12, wherein:

if the absolute value of the difference between the middle signal and high signal is greater than the failure threshold, a last valid output is used as the first output; and if the absolute value of the difference between the middle signal and low signal is greater than the failure threshold, a last valid output is used as the second output.

14. The apparatus of claim 11, wherein:

the first output is computed as an average of the middle signal and the high signal biased towards the middle signal; and the second output is computed as an average of the middle signal and the low signal biased towards the middle signal.

15. The apparatus of claim 11 wherein the first, second, and third module are implemented in a system on a chip application.

16. A system for simplified fault tolerant three input channel voting comprising:

a plurality of sensors providing three input signals;

a voting apparatus coupled to the sensors, further comprising:

a microprocessor; and a computer readable medium; wherein, the computer readable medium configured to provide instructions to the microprocessor to execute a sorting function, testing function, and averaging function; wherein, the sorting function sorts the three input signals by magnitude into a high signal, middle signal, and low signal;

the testing function compares differences between the high signal and middle signal, and middle signal and low signal to a failure threshold, and provides a first intermediate value and second intermediate value indicative of results of said comparison;

the averaging function averages the first intermediate value and second intermediate value from the testing module to produce an output indicative of the three input signals; and a control system coupled to the voting apparatus.

17. The system of claim 16, wherein the control system is a flight control system.

18. The system of claim 16, wherein the sensors provide air data measurements.

19. The system of claim 18, wherein the air data measurements comprises static pressure measurements.

20. The system of claim 16, wherein the sorting module, testing module, and averaging module are implemented in a system on a chip application.

\* \* \* \* \*